United States Patent Office 3,287,269
Patented Nov. 22, 1966

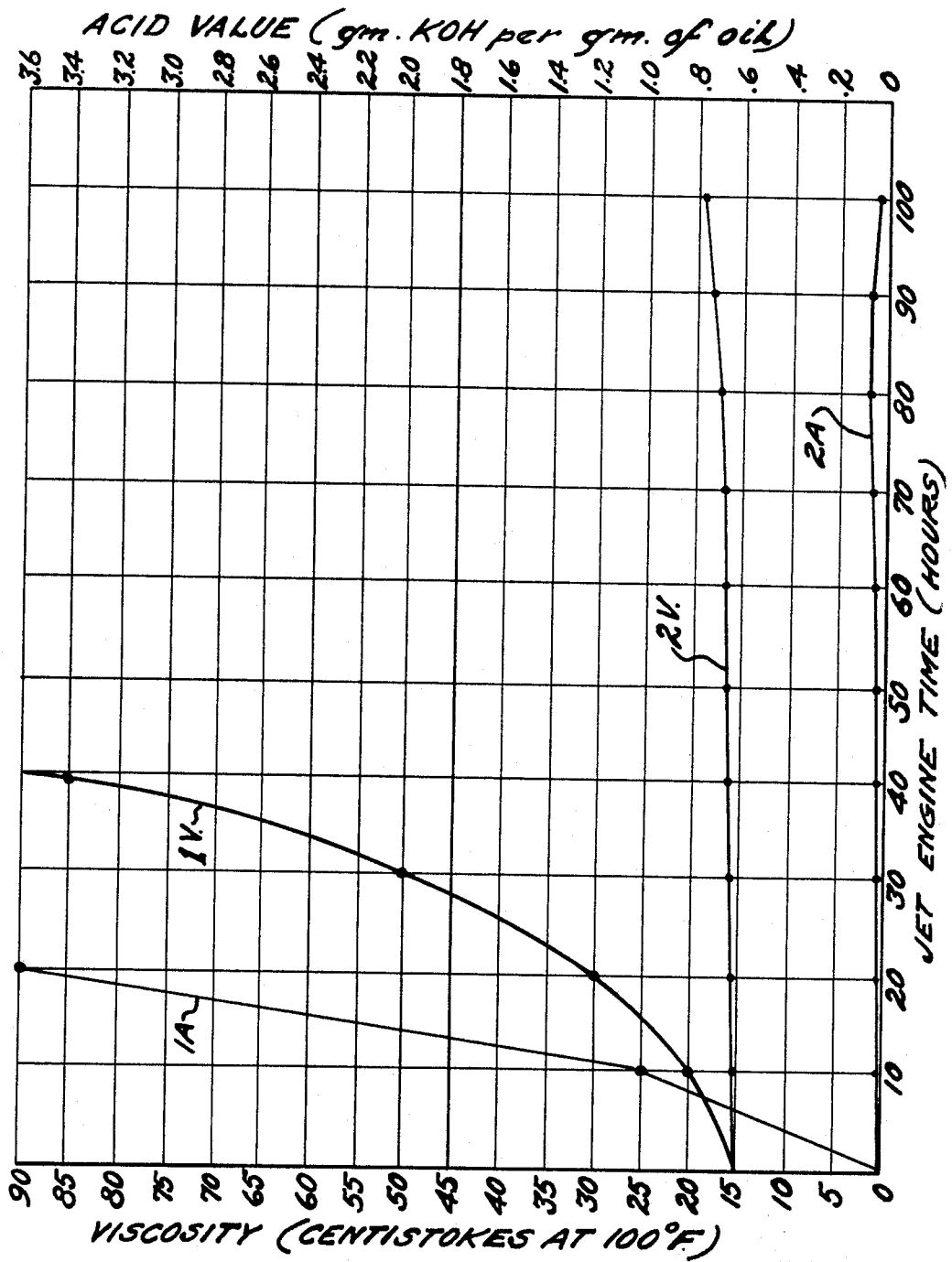

3,287,269
OXIDATION INHIBITOR FOR LUBRICATING COMPOSITION
Harold W. Adams, Dayton, Ohio, assignor to the United States of America as represented by the Secretary of the Air Force
Filed July 12, 1960, Ser. No. 42,446
20 Claims. (Cl. 252—49.6)

The invention described herein may be manufactured and used by or for the United States Government for governmental purposes without payment to me of any royalty thereon.

This invention relates to an oxidation inhibitor for use with lubricating compositions and more specifically for use with synthetic ester type lubricating oils which are particularly adapted for use at the high and low temperatures encountered during the operation of aircraft gas turbine engines.

Lubricating compositions for use in aircraft and gas turbines must possess special properties not found in conventional lubricants. The primary problem is concerned with finding a lubricating oil which will operate effectively for prolonged periods of time under the varied temperature conditions that gas turbine engines encounter during flight operation. In order for such an engine to operate efficiently the lubricant must possess a high viscosity index to insure adequate lubrication, a low pourpoint in order to provide for proper functioning at low temperatures and a high flash point to avoid evaporation losses at elevated temperatures.

In an attempt to provide a lubricant having the aforementioned properties, considerable effort has been expended in developing synthetic ester-type lubricating oils. These esters vary from simple monohydric alcoholic esters of mono-, di- or poly-carboxylic acids to the more complex esters derived from polyhydric alcohols, half-esters or ethers of glycols together with di- or poly-carboxylic acids. In general, these ester lubricants are characterized by properties that are most desirable for the lubrication of gas turbine engines in that they possess low pour-points and have excellent viscosity-temperature properties.

However, ester-type lubricants find restricted applicability at elevated temperatures in view of the fact that the esters lack sufficient oxidative stability to meet the performance requirements of aircraft gas turbine engines operating over prolonged periods of time. Oxidation of the lubricant results in complete breakdown of the oil into aldehydes, ketones, alcohols and acids accompanied by sludge formation which clogs line filters and prevents adequate lubrication of the engine components. The inadequate lubrication and the corrosive action which occurs as a result of the oxidative breakdown leads to engine failure or complete break up of the engine.

In an attempt to overcome this basic deficiency, and stabilize the thermal characteristics of ester lubricants, the prior art has suggested the use of various antioxidant additives, such as organic amines and phenols. However, the additives suggested heretofore have not proved satisfactory for use with high temperature lubricants especially those employed with gas turbine engines operating at bulk oil temperatures in excess of 400° F.

Accordingly, it is the primary object of this invention to circumvent the above noted limitations of the prior art by producing a novel lubricant composition particularly adapted for use over a wide range of temperature conditions.

Another object of this invention is to provide for an antioxidant additive for use in lubricating compositions.

Still another object of this invention is to provide for ester-type lubricants having oxidative and thermal stability when employed as lubricating agents for extended periods of time.

A further object of this invention is to provide a process for improving the oxidative and thermal stability of ester-type lubricants.

A still further object of this invention is to provide for ester-type lubricants particularly adapted for use with gas turbine engines.

The above and still further objects, advantages and features of this invention will become apparent upon consideration of the following detailed description thereof when read with reference to the accompanying drawing which graphically represents the oxidative stability of an ester-type lubricant having the oxidation inhibitor of this invention incorporated therein.

It has been found in accordance with the invention, that the aforestated objects are accomplished by providing ester-type lubricants with an antioxidant additive comprising a mixture, in approximately equal parts, of 5-ethyl-10,10-diphenylphenazasiline and N-phenyl-1-napthylamine. The separate use of either component of the antioxidant mixture does not produce satisfactory results with respect to increased oxidative resistance. Thus, a mixture of additives is necessary if increased oxidative stability is desired. The antioxidant mixture may be added to any of the well known synthetic ester-type lubricants such as those simple esters derived from monocarboxylic acids to the more complex esters derived from the polycarboxylic acids. The exact mechanism of the reaction which produces the increased oxidative stability for these ester-type lubricants is not fully understood. However, something more than a mere synergistic effect is produced since neither of the individual components of the mixture, when added alone, imparts to the ester the unexpected increase in oxidative stability that is achieved by adding the components as a mixture.

Described more specifically the invention contemplates the addition, to an ester lubricant, of about 1.25 percent to about 3.0 percent by weight of an antioxidant mixture which mixture comprises about 0.5% to 2.0% by weight of N-phenyl-1-napthylamine and about 0.75% to 1.0% by weight of 5-ethyl-10,10-diphenylphenazasiline. A sacrifice in terms of acid buildup occurs when the N-phenyl-1-naphthylamine is employed at the 0.5% level, especially when the concentration of 5-ethyl-10,10-diphenylphenazasiline is at a 1.0% level. Excessive sludge formation during engine operation often results from the use of 2.0% N-phenyl-1-naphthylamine. Thus, the optimum concentration of N-phenyl-1-naphthylamine is at the 1.0% level. Reduction of 5-ethyl-10,10-diphenylphenazasiline from the preferred 1.0% level to 0.75% may be effected without reducing the oxidative resistance of the lubricant. No advantage is achieved by employing the 5-ethyl-10,10-diphenylphenazasiline component at a level greater than 1.0%.

The additive mixture has been found to be especially effective with trimethylolpropane esters of aliphatic saturated monocarboxylic acids having four or more carbon atoms in the chain, such as valeric, enanthic and pelargonic acid; and aliphatic saturated dicarboxylic acids having two or more carbon atoms in the chain, such as adipic, pimelic, azelaic and sebacic acid. Further, the antioxidant mixture may be added to trimethylolpropane esters derived from a mixture of the acids enumerated heretofore, such as a trimethylolpropane mono-pelargonic, di-valerate ester.

The invention further contemplates adding the novel oxidation inhibiting mixture to pentaerythritol esters of the above disclosed acids and, in addition, to diesters such as di(2-ethylhexyl) adipate, di(2-ethylhexyl) sebacate, diethyl pimelate, di(1-ethyl propyl) azalate and other esters and diesters derived from the commonly available alcohols and acids, provided the esters are of sufficient purity and exhibit little unsaturation.

If desired various other additive agents may be incorporated in the lubricants of this invention in order to improve lubrication efficiency. For example, viscosity index improvers, thickeners, pour depressants, dyes and other conventional agents may be added.

The following examples are presented to further illustrate the present invention. It is to be understood, however, that these examples are not to be taken as limiting the inventive concept in any way but are merely illustrative of the invention. The parts recited in the examples are parts by weight unless otherwise indicated.

*Example 1*

| | Parts |
|---|---|
| Trimethylolpropane enanthate | 100.0 |
| 5-ethyl-10,10-diphenylphenazasiline | 1.0 |
| N-phenyl-1-naphthylamine | 1.0 |

*Example 2*

| | |
|---|---|
| Trimethylolpropane monopelargonic, di-valerate | 100.0 |
| 5-ethyl-10,10-diphenylphenazasiline | 0.75 |
| N-phenyl-1-naphthylamine | 1.00 |

*Example 3*

| | |
|---|---|
| Di(2-ethylhexyl)sebacate | 100.0 |
| 5-ethyl-10,10-diphenylphenazasiline | 1.0 |
| N-phenyl-1-naphthylamine | 1.5 |

*Example 4*

| | |
|---|---|
| Trimethylolpropane valerate | 100.0 |
| 5-ethyl-10,10-diphenylphenazasiline | 1.0 |
| N-phenyl-1-naphthylamine | 2.0 |

The above compositions, when tested for lubricating quality, gave outstanding results when tested following use in a gas turbine engine over prolonged periods of operation at elevated temperatures, especially with respect to oxidation resistance.

Referring to the drawing there is disclosed a graphical representation of the oxidative resistance achieved by the ester of Example 1, with and without the antioxidant mixture of this invention incorporated therein. Curves are plotted, according to A.S.T.M. requirements, for the viscosity and the acid value as a function of engine time. Curve 1A represents the acid value of a trimethylolpropane enanthate ester without the oxidation inhibitor of this invention, while curve 2A represents the acid value with the oxidation inhibitor incorporated in the ester.

Curve 1V represents the viscosity index of a trimethylolpropane enanthate ester without the oxidation inhibitor while curve 2V represents the viscosity index of the aforesaid ester having the oxidation inhibitor added thereto.

It will be noted that curves 2A and 2V, that is the ester lubricant containing the antioxidant mixture of this invention, amply demonstrate the increase in oxidative resistance achieved over prolonged periods of engine operation. The base ester when used alone has a useful life in the engine for less than 15 hours, while the incorporation of the additive of the present invention increases that usefulness for a period of time in excess of 100 hours.

To summarize briefly, this invention provides a novel class of synthetic ester lubricants characterized by having low pour points, excellent viscosity properties, low volatility, high oxidative resistance, and thermal stability which are especially adapted for use in aircraft gas turbine engines.

It should be noted that the compositions of this invention are not limited to use as gas turbine engine lubricants but may be employed as lubricants for aeronautical instruments, gyroscopes, meters, gun turrets and a variety of other scientific devices which may encounter elevated operational temperatures. In addition, the fluid formulations of this invention may be used to manufacture greases, heat transfer fluids and general lubrication fluids.

While specific embodiments of the present invention have been described with particularity, it will be evident to those skilled in the art that the invention is not limited thereto but that various modifications may be made without departing from the spirit of the invention as defined by the scope of the appended claims.

Having thus described my invention, what I claim and desire to protect by Letters Patent is:

1. An oxidation inhibitor for fluid ester lubricating compositions consisting essentially of a mixture of about 0.75 to 1.0 part by weight of 5-ethyl-10,10-diphenylphenazasiline and 0.5 to 2.0 parts by weight of N-phenyl-1-naphthylamine.

2. An oxidation inhibitor for fluid ester lubricating compositions consisting essentially of a mixture in approximately equal parts by weight of 5-ethyl-10,10-diphenylphenazasiline and N-phenyl-1-naphthylamine.

3. A fluid ester lubricating composition consisting essentially of as the base lubricant an ester derived from a carboxylic acid having from 2 to 10 carbon atoms which is blended with a mixture of about 0.75 to 1.0 part by weight of 5-ethyl-10,10-diphenylphenazasiline and 0.5 to 2.0 parts by weight of N-phenyl-1-naphthylamine wherein said mixture is present in an amount sufficient to impart oxidative stability to said base lubricant.

4. The lubricating composition as defined in claim 3 wherein said mixture is present in an amount from about 1.25 percent by weight to about 3.0 percent by weight of the total composition.

5. The lubricating composition as defined in claim 3 wherein said base lubricant comprises a trimethylolpropane ester derived from a carboxylic acid having from two to ten carbon atoms.

6. The lubricating composition as defined in claim 3 wherein said base lubricant comprises a pentaerythritol ester derived from a carboxylic acid having from two to ten carbon atoms.

7. The lubricating composition as defined in claim 3 wherein said base lubricant comprises an ester derived from a carboxylic acid having from two to ten carbon atoms and a monohydric alcohol having from two to ten carbon atoms.

8. The lubricating composition as defined in claim 3 wherein said base lubricant comprises a trimethylolpropane ester of an acid selected from the group consisting of valeric acid, enanthic acid, pelargonic acid, adipic acid, pimelic acid, azelaic acid, sebacic acid and mixtures thereof.

9. The lubricating composition as defined in claim 3 wherein said base lubricant comprises a trimethylolpropane valerate.

10. The lubricating composition as defined in claim 3 wherein said base lubricant comprises trimethylolpropane enanthate.

11. The lubricating composition as defined in claim 3 wherein said base lubricant comprises trimethylolpropane pelargonoate.

12. The lubricating composition as defined in claim 3 wherein said base lubricant comprises trimethylolpropane azelate.

13. The lubricating composition as defined in claim 3 wherein said base lubricant comprises trimethylolpropane monopelargonic, di-valerate.

14. The lubricating composition as defined in claim 3 wherein said base lubricant comprises di-(2-ethylhexyl) sebacate.

15. The method of lubricating relatively moving metallic bodies which comprises maintaining between their bearing surfaces a fluid composition consisting essentially of an ester derived from a carboxylic acid having from 2 to 10 carbon atoms and a mixture of about 0.75 to 1.0 part by weight of 5-ethyl-10,10-diphenylphenazasiline and 0.5 to 2.0 parts by weight of N-phenyl-1-naphthylamine incorporated therein and in which said mixture is present in an amount sufficient to impart oxidative stability to said fluid composition.

16. The method of lubrication as defined in claim 15 wherein said metallic bodies form component parts of a gas turbine engine.

17. A high temperature lubricant comprising a major proportion of an alkanoic acid ester of a polyol having two to four mehylol groups on a quaternary carbon atom, said alkanoic acid having an average of from 5 to 8 carbon atoms, said ester being stabilized against high temperature oxidative degradation by a minor proportion of phenyl-α-naphthylamine and a minor proportion of N-ethylphenodiphenyl silazine.

18. A high temperature lubricant comprising a major proportion of an alkanoic acid ester of trimethylolpropane, said alkanoic acid having an average of from 5 to 8 carbon atoms, said ester being stabilized against high temperature oxidative degradation by from 0.5 to 2.0 weight percent of phenyl-α-naphthylamine and from 0.75 to 1.0 weight percent of N-ethylphenodiphenyl silazine.

19. A high temperature lubricant comprising a major proportion of trimethylolpropane triheptanoate, said trimethylolpropane triheptanoate being stabilized against high temperature oxidative degradation by from about 0.5 to about 2 weight percent of phenyl-α-naphthylamine and from about 0.75 to about 1.0 weight percent of N-ethylphenodiphenyl silazine.

20. An anti-oxidant composition for carboxylic ester lubricants consisting essentially of phenyl-α-naphthylamine and N-ethylphenodiphenyl silazine in a weight ratio from 0.5:1.0 to 2.0:0.75.

References Cited by the Examiner
UNITED STATES PATENTS

| | | | |
|---|---|---|---|
| 2,950,250 | 8/1960 | Fainman | 252—49.6 |
| 3,036,005 | 5/1962 | Koch | 252—49.6 |

OTHER REFERENCES

Atkins et al.: "Development of Additives and Lubricating Oil Compositions," I and E Chem., vol. 39, No. 4, pp. 491–7.

Dintses et al.: "Synthetic Lubricating Oils," published by Liaison Office, Technical Information Center, Wright-Patterson AFB, Ohio, F–TS–9719/V, August 1959, pp. 283–304.

DANIEL E. WYMAN, *Primary Examiner.*

JULIUS GREENWALD, ALPHONSO D. SULLIVAN,
*Examiners.*

J. L. FOLTZ, J. R. SEILER, W. H. CANNON,
*Assistant Examiners.*